US010046503B2

(12) United States Patent
Nava et al.

(10) Patent No.: US 10,046,503 B2
(45) Date of Patent: Aug. 14, 2018

(54) BLOWING OR STRETCH-BLOWING MACHINE FOR BOTTLES MADE OF POLYMER MATERIAL

(71) Applicant: SMI S.p.A., Bergamo (IT)

(72) Inventors: Paolo Nava, Bergamo (IT); Paolo Romitti, Bergamo (IT); Dario Merelli, Bergamo (IT); Marco Grazioli, Bergamo (IT)

(73) Assignee: SMI S.p.A., Bergamo (IT)

( * ) Notice: Subject to any disclaimer, the term of this patent is extended or adjusted under 35 U.S.C. 154(b) by 217 days.

(21) Appl. No.: 15/146,138

(22) Filed: May 4, 2016

(65) Prior Publication Data

US 2016/0361858 A1 Dec. 15, 2016

(30) Foreign Application Priority Data

Jun. 10, 2015 (IT) ................. 10201522324

(51) Int. Cl.
*B29C 49/36* (2006.01)
*B29C 49/48* (2006.01)
(Continued)

(52) U.S. Cl.
CPC ............. *B29C 49/28* (2013.01); *B29C 49/48* (2013.01); *B29C 49/56* (2013.01); *B29C 49/06* (2013.01);
(Continued)

(58) Field of Classification Search
CPC . B29C 49/36; B29C 49/56; B29C 2049/4892; B29C 49/4236
See application file for complete search history.

(56) References Cited

U.S. PATENT DOCUMENTS 9,278,476 B2 * 3/2016 Sato ................... B29C 49/4215
2010/0156009 A1 6/2010 Voth et al.
(Continued)

FOREIGN PATENT DOCUMENTS

DE 10 2008 045 569 A1 3/2010
EP 2 202 047 A1 6/2010
WO WO-2015055499 A1 * 4/2015 ............. B29C 49/56

OTHER PUBLICATIONS

Italian Search Report Corresponding to UB20150993 dated Feb. 10, 2016.

*Primary Examiner* — Robert B Davis
(74) *Attorney, Agent, or Firm* — Davis & Bujold PLLC; Michael J. Bujold (57) ABSTRACT

A blowing or stretch-blowing machine for preforms made of polymer material. The blowing or stretch-blowing machine (1) has a plurality of molds (1) movable on a transport system, in which each of the molds (1) comprises a first half-mold (2a) and a second half-mold (2b) hinged around a hinge axis (3) and a bottom plate (4) adapted to cooperate with the half-molds (2a, 2b) for closing the bottom of the mold (1), and a mechanism for vertical/translational movement of the bottom plate, to cyclically form a closed cavity adapted to receive a preheated preform and allow expansion, by blowing or stretch-blowing of the preform inside the cavity, to obtain a bottle or container. Each of the molds (1) comprises a system for synchronized opening/closing of the half-molds (2a, 2b) and of the bottom plate (4) actuated by an actuator thereof (30) independent from motorization of the machine.

15 Claims, 7 Drawing Sheets

(51) Int. Cl.
*B29C 49/56* (2006.01)
*B29C 49/28* (2006.01)
B29C 49/06 (2006.01)
B29L 31/00 (2006.01)

(52) U.S. Cl.
CPC ...... *B29C 49/36* (2013.01); *B29C 2049/4892* (2013.01); *B29L 2031/757* (2013.01)

(56) References Cited

U.S. PATENT DOCUMENTS

| | | | |
|---|---|---|---|
| 2011/0175246 A1* | 7/2011 | Winzinger | B29C 49/78 264/40.1 |
| 2014/0030373 A1 | 1/2014 | Graffin | |
| 2016/0001487 A1* | 1/2016 | Yang | B29C 49/4236 264/523 |
| 2016/0250797 A1* | 9/2016 | Michel | B29C 49/56 425/150 |

* cited by examiner

BLOWING OR STRETCH-BLOWING MACHINE FOR BOTTLES MADE OF POLYMER MATERIAL

The present invention relates to a blowing or stretch-blowing machine for preforms made of polymer material adapted to transform said preforms into bottles or containers, and in particular to the forming half-mold closing mechanism.

Obtaining bottles or containers by blowing suitable appropriately heated preforms in a mold of the desired shape is a widely known technique in the packaging sector, in particular for making bottles or containers.

There are substantially two different techniques, simple blowing and stretch-blowing, which include pneumatic blowing and the concurrent mechanical stretching of the preform in the mold. In both cases, the preforms must reach the blowing or stretch-blowing machine in a thermal condition which corresponds to the softening point of the material, so as to be able to be plastically deformed inside the molds.

Blowing or stretch-blowing machines for preforms are known and comprise a plurality of openable molds comprising two half-molds hinged at an end and actuated by means of appropriately arranged leverages sized to allow the opening and closing thereof in synchronized manner with predetermined steps of loading of the preforms and of unloading of the formed bottle. Such leverages are generally operated by means of a shaped cam coupling, such a coupling being adapted to provide an alternating motion with pattern defined by the shape of the cam itself.

In rotating machines, a plurality of molds is arranged radially about a central rotation axis and means for opening and closing the molds are synchronized with the movement of other devices which cooperate in the operation of the machine, e.g. a movement device for the entering preforms and the exiting bottles, or a blowing and movement device of different components of the molds.

The conventional mold movement and opening/closing systems are complex and, above all, not very versatile. Indeed, in order to modify the opening/closing pattern it is necessary to replace the cam system with a different one in which the profile of the cam corresponds to the new movement. Furthermore, by implying the use of complex mechanical movement transmission systems, the conventional machines are subject to high wear and thus to frequent and careful maintenance.

The problem addressed by the present invention is to make available a blowing or stretch-blowing machine for bottles made of plastic material which allows to overcome the disadvantages illustrated above and which is thus simpler to construct, requiring less maintenance and having greater flexibility.

Such a problem is solved by a machine as outlined in the accompanying claims, the definitions of which form an integral part of the present description.

Further features and advantages of the present invention will be apparent from the description of some exemplary embodiments, given here by way of non-limiting example with reference to the following figures.

With reference to the figures, reference numeral 1 indicates as a whole an injection forming mold of a container in blowing or stretch-blowing machines. Typically, a blowing or stretch-blowing machine according to the invention is of the rotating type and, comprises a plurality of molds 1 arranged radially with respect to a substantially vertical rotation axis of the machine.

By turning about the rotation axis of the machine, each mold 1 is cyclically carried to a loading station of a preform and/or an unloading station of a bottle obtained from the preform. The blowing or stretch-blowing is performed between the loading of the preform and the unloading of the bottle.

Each mold 1 comprises a first half-mold 2a and a second half-mold 2b hinged about a hinge axis 3, normally parallel to the rotation axis of the machine. The hinge axis 3 is arranged at an end of the half-molds 2a, 2b facing towards the axis of the machine, while the half-molds 2a, 2b on the opposite end comprise edges 9a, 9b intended to face each other when the mold 1 is closed.

Each half-mold 2a, 2b is C-shaped in cross section, comprising a front portion 37a, 37b, a side portion 38a, 38b and a rear portion 39a, 39b.

The first half-mold 2a and the second half-mold 2b can thus turn about the hinge axis 3 between a closed mold configuration (FIGS. 1A, 2A, 3A, 4A and 6A) and an open mold configuration (FIGS. 1B, 2B, 3B, 4B, 5 and 6B). The half-molds 2a, 2b can thus be opened/closed like two shells of a bivalve shell.

Mold 1 comprises a bottom plate 4 adapted to cooperate with the half-mold 2a, 2b for closing the bottom of the mold 1 and vertical/translation movement of the bottom plate, for cyclically forming a closed cavity adapted to receive a preheated preform and for allowing the expansion of the preform by blowing or stretch-blowing in the cavity to obtain a bottle or a container.

The bottom plate 4 slides vertically on a guide element 46, fixed to the support structure of the blowing or stretch-blowing machine or of the mold 1, by means of a slide 47.

Figure 7:
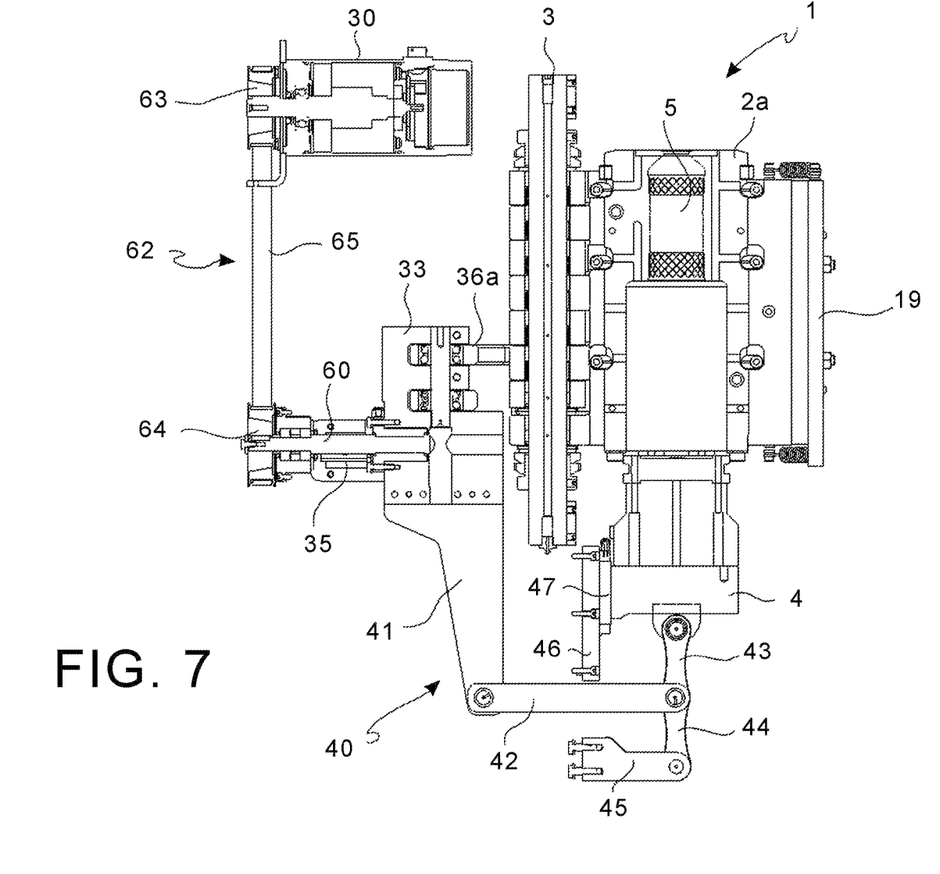
FIG. 7 shows a section side view of the mold in FIG. 6A, on which a shaped profile is mounted.

The half-molds 2a, 2b comprise an outer face 5a, 5b and an inner face 6a, 6b, respectively. Respective shaped portions S (shown by way of example in FIG. 7 relatively to the embodiment in FIG. 5) are applied onto the inner faces 6a, 6b, which portions taken as a whole, with the mold closed, reproduce as a negative shape the outer shape of the bottle to be obtained from the preform and delimit the space in which the preform is expanded.

In some embodiments, such a shaped portion S can be separated from the half-molds 2a, 2b and is interchangeable, so as to allow the forming of bottles having different shapes and sizes. In such a manner, it is sufficient to replace the shaped portions S to start the production of different bottles.

The half-molds 2a, 2b comprise a bottom opening from which the lower part of the shaped portions S protrude, the shaped portions S having, in turn, a bottom opening at a bottom portion of the bottle to be obtained, said opening adapted to be closed with alternate motion by the aforesaid bottom plate 4.

As shown in FIG. 3, abutment profiles 10a, 10b are applied on the edges 9a, 9b of the respective half-molds 2a, 2b.

In preferred embodiments, the abutment profiles 10a, 10b are removable and may be changed in case of wear.

On one of the two half-molds 2a, 2b (on the right half-mold 2b, in the example in the figures) a closing element 19 of the mold 1 is rotationally mounted, the closing element 19 being adapted to keep the half-molds 2a, 2b joined during the blowing or stretch-blowing process.

The movement mechanism of the closing element 19 and the retaining system of the half-molds is described in patent application EP15164317.8 filed on 20 Apr. 2015 by the same Applicant.

The blowing and stretch-blowing machine of containers according to the present invention is characterized in that it envisages an opening/closing system of the half-molds 2a, 2b and of the bottom plate 4 which envisages an independent motorization instead of the actuation cam. Thus, each mold 1 of the blowing and stretch-blowing machine comprises its own motorization which will open/close the half-molds 2a, 2b and bottom plate 4 and will be independent from the motorization of the machine which in turn transports the molds 1 along the working path.

The aforesaid motorization for the opening/closing the half-molds 2a, 2b and the bottom plate 4 is an actuator with either rotating or linear movement. Preferred examples of actuators are stepper motors, preferably either linear or rotating brushless motors.

Mold 1 according to the invention thus comprises an actuator which moves a single synchronized actuation opening/closing mechanism of the half-mold 2a, 2b and of the bottom plate 4.

This embodiment, as described in better detail below, further to allowing a greater control of the blowing or stretch-blowing process, it has the advantage of reducing vibrations, noise and wear of the machine by virtue of the fact that it is free of mechanical cams.

Figure 1A:
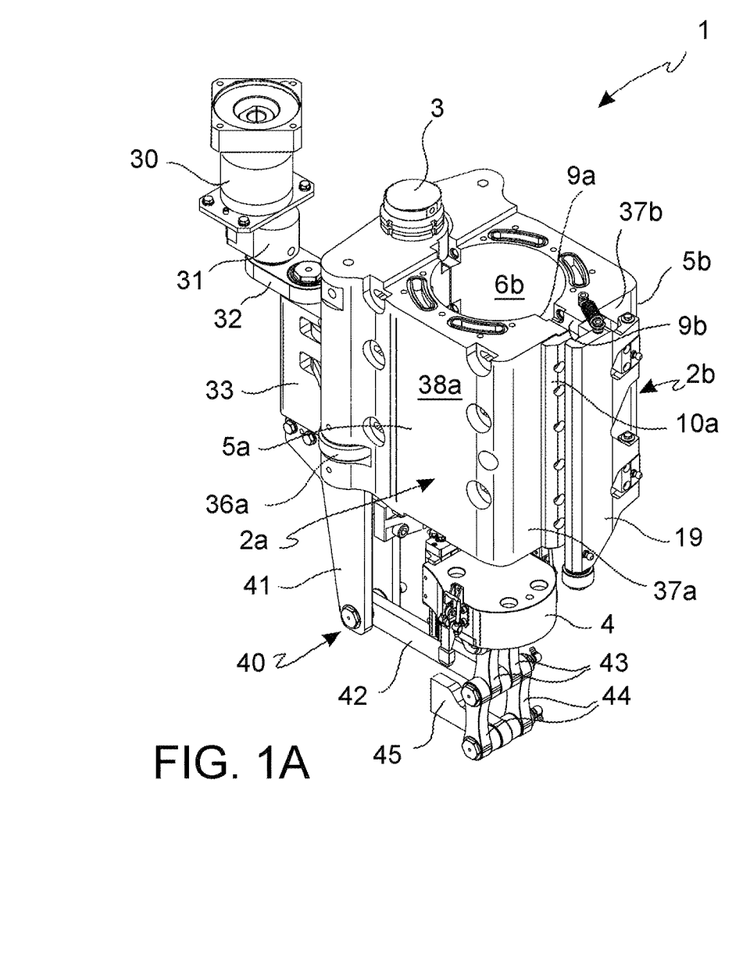
FIGS. 1A and 1B show perspective views of a first embodiment of a mold for containers made of plastic material according to the invention, in two different operating conditions.
Figure 1B:
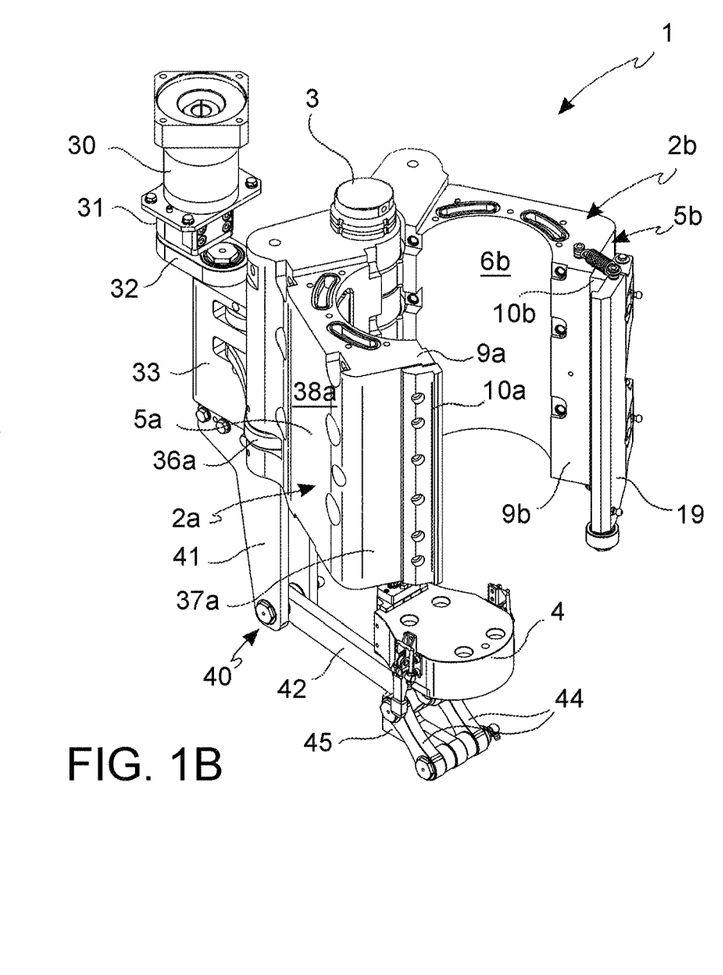
Figure 2A:
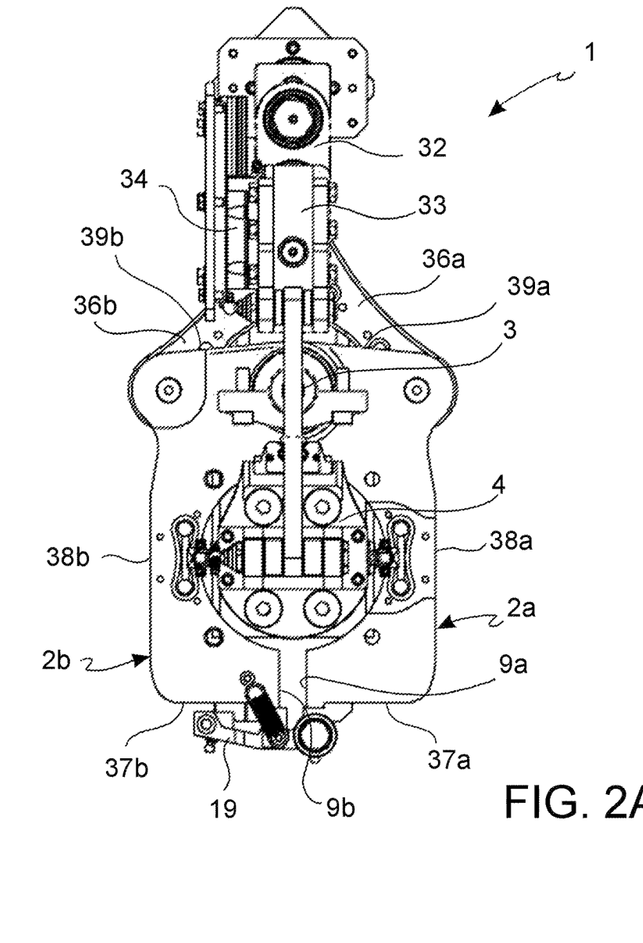
FIGS. 2A and 2b show views from the bottom of the mold in FIGS. 1A and 1B, in the respective operating conditions.
Figure 2B:
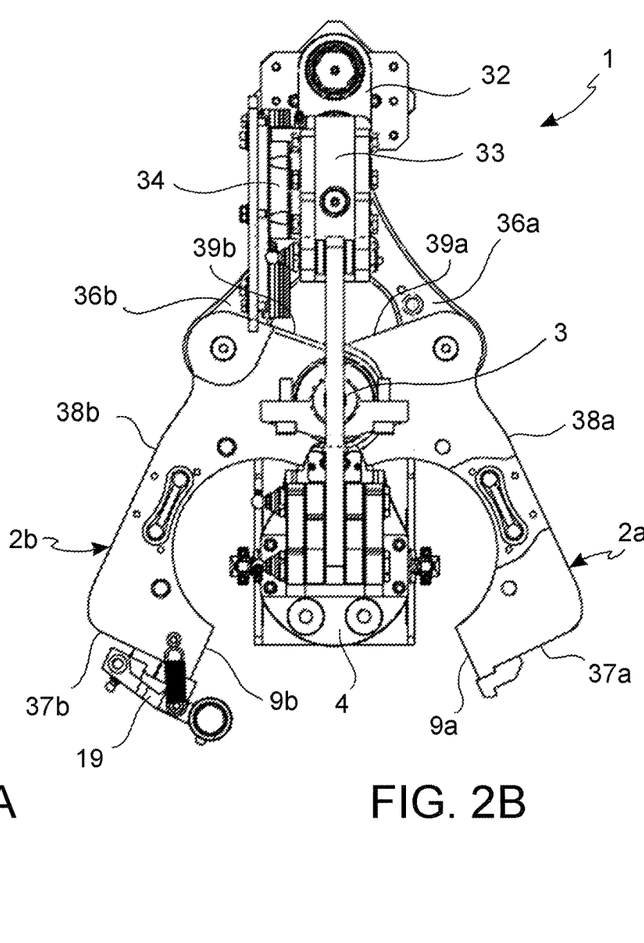
Figure 3A:
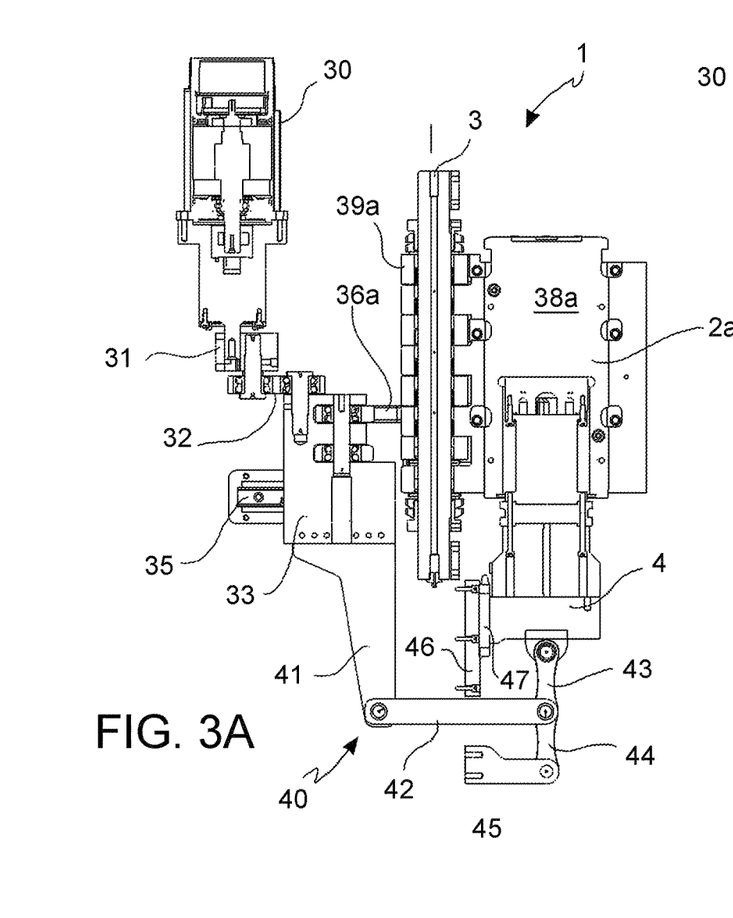
FIGS. 3A and 3B show section side views of the mold in FIGS. 1A and 1B, in the respective operating conditions.
Figure 3B:
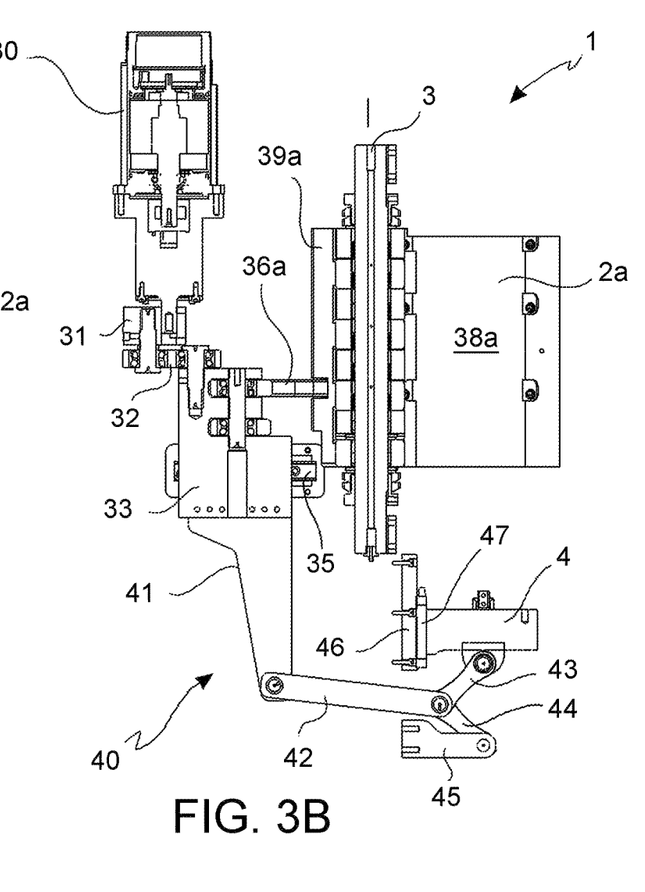

In the figures from 1A to 3B, it is shown a first embodiment of the mold 1 according to the invention in a close operating condition (FIGS. 1A, 2A and 3A) and in an open operating condition (FIGS. 1B, 2B and 3B).

The mold 1 comprises an actuator 30. In the example shown, the actuator 30 is either a stepper or a brushless motor of the rotating type coupled to a ratio motor.

The actuator 30 is placed vertically with the shaft facing downwards and acts on an eccentric member 31, in turn hinged to an end of a crank 32. The opposite end of the crank 32 is instead hinged to a sliding member 33, which slides horizontally along a direction defined by a straight line which lies on the vertical plane that divides the half-molds 2a, 2b.

The sliding member 33 comprises a slide 34 slidingly mounted on guide means 35, which may comprise a rail or a single rail. The guide means 35 are fixed and are mounted on the support structure of the blowing or stretch-blowing machine or of the mold 1. The sliding member 33 may thus slide between an advanced (or closed) position and a retreated (or open) position.

The sliding member 33 is connected to the two half-molds 2a, 2b by means of respective connecting rods 36a, 36b.

The first ends of the two connecting rods 36a, 36b are coaxially hinged onto the sliding member 33, while the opposite ends are hinged at the joint point between the side portions 38a, 38b and the rear portions 39a, 39b of the half-molds 2a, 2b, respectively. In this manner, as shown in particular in FIGS. 2A and 2B, when the sliding member 33 is in advanced position, the half-molds 2a, 2b are found facing along the edges 9a, 9b and the mold 1 is closed; conversely, when the sliding member 33 is in the retreated position (FIG. 2B), the connecting rods 36a, 36b act on the hinging points with the half-molds 2a, 2b, taking them to the open position.

It is apparent that all intermediate positions of the sliding member 33 along the guide means 35 correspond to a different degree of opening of the half-molds 2a, 2b. As will be explained better below, the possibility of defining a different degree of opening of the half-molds 2a, 2b as a function of the size of the container to be formed allows to optimize the processing times: indeed, for small size containers it will not be necessary to open the molds completely to load the preform and unload the formed container, thus reducing the overall time for each working step and allowing to speed up the production cycle. This is also the case of larger containers, because it will still be possible to open the half-molds 2a, 2b only partially to load the preforms, which are small.

Another advantage connected to an only partial opening of the half-molds 2a, 2b resides in the decrease of the forces in hand and of the vibrations of the machine.

The sliding member 33 is also operatively connected to an opening-closing mechanism of the bottom plate 4.

As shown in the figures, such a mechanism is a pantograph mechanism. A system of articulated arms 40 is associated with the lower side of the sliding member 33, the system comprising:

a first arm 41 having a proximal end and a distal end, wherein the proximal end is fixed on the lower part to the sliding member 33;

a second arm 42, having a proximal end and a distal end, wherein the proximal end is hinged at the distal end of the first arm 41;

a pair of connecting rod-like arms 43, 44, each having a proximal end and a distal end, wherein the respective proximal ends are coaxially hinged to the distal end of the second arm 42, and wherein:

the distal end of a first connecting rod-like arm 43 is hinged on the lower surface of the bottom plate 4, and the distal end of the second connecting rod-like arm 44 is hinged to a fixed element 45.

The fixed element 45 is supported by the support structure of the blowing or stretch-blowing machine or of the mold 1.

As shown in FIGS. 2A and 2B, in some embodiments both the first 43 and the second 44 connecting rod-like arms consist of a pair of parallel arms.

As shown in particular in FIGS. 3A and 3B, when the sliding member 33 is in an advanced position (FIG. 3A), the connecting rod-like arms 43, 44 are positioned aligned perpendicularly with respect to the second arm 42, and the bottom plate 4 is in a raised position (or closed position); conversely, when the sliding member 33 is in a retreated position (FIG. 3B), the connecting rod-like arms 43, 44 assume a V-position and the bottom plate is in a lowered position (or open position).

In the embodiment shown in figures from 1A to 3B, the eccentric 31-crank 32 system for moving the sliding member 33 allows to operate the mold 1 between the closed position (FIGS. 1A, 2A and 3A) and a total opened condition (FIGS. 1B, 2B and 3B) by means of the rotation of the shaft of the rotating actuator 30 to only one direction. This allows to avoid the steps of stopping and restarting which can cause vibrations to the machine. Conversely, a movement in alternating directions must be envisaged if it is desired to open the mold 1 only partially (as mentioned above in the case of small size containers).

FIGS. 4A, 4B and FIGS. 5, 6A and 6B show two alternative embodiments of the mold 1 of the invention, respectively. In such embodiments, the operating connection between sliding member 33 and half-molds 2a, 2b and bottom plate 4 is the same and consequently will not be described again. Conversely, such embodiments envisage different types of movement of the sliding member 3 by means of an actuator 30.

Figure 4A:
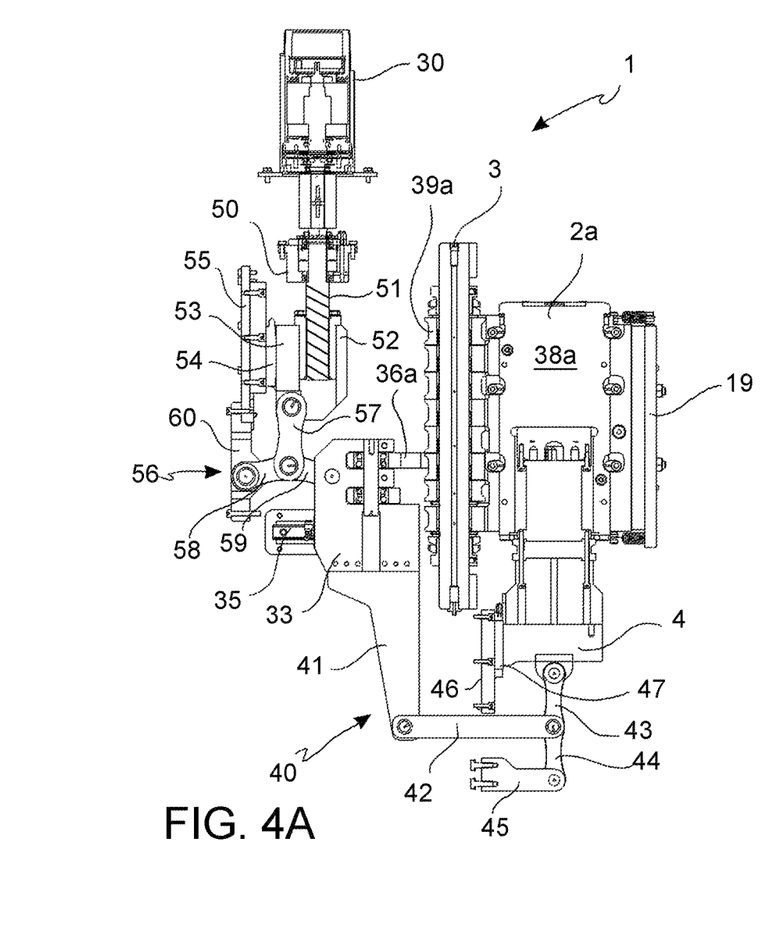
FIGS. 4A and 4B show section side views of a second embodiment of a mold for containers made of plastic material according to the invention, in two different operating conditions.
Figure 4B:
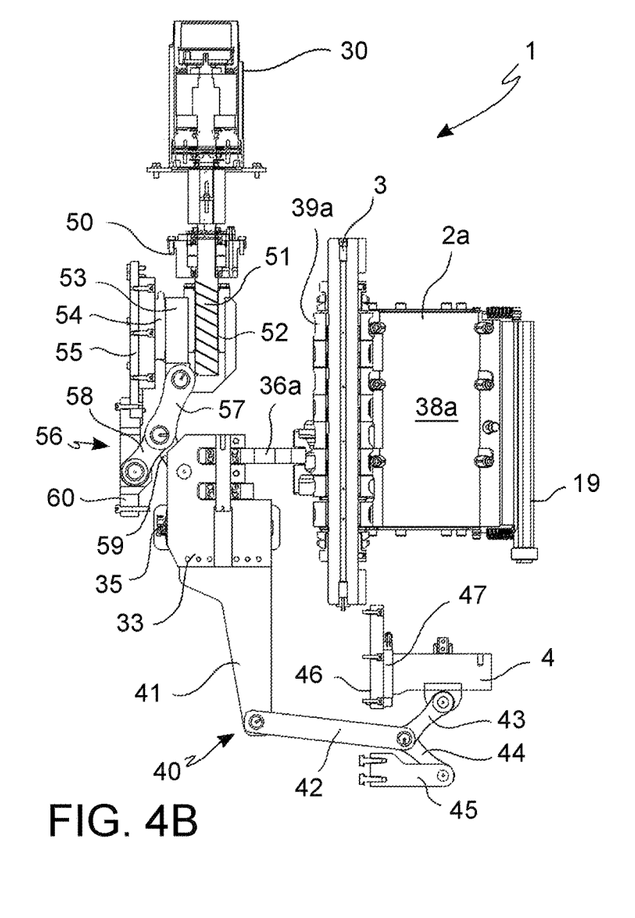

With reference to FIGS. 4A and 4B, the rotating actuator 30 is connected to an Archimedes' screw 51, by means of a ratio motor 50.

The Archimedes' screw 51 is operatively connected to a movable member 52. The moveable member 52 comprises a tubular portion having internally bosses which mate with the grooves of the Archimedes' screw 51. In such a manner, when Archimedes' screw 51 rotates, the movable member 52 moves upwards or downwards according to the rotation direction of the Archimedes' screw 51.

The moveable member 52 comprises an outer support portion 53 comprising a slide 54 arranged parallel to the Archimedes' screw 51. The slide 54 slides on a guide element 55 fixed onto the support structure of the blowing or stretch-blowing machine or of the mold 1. A greater stability of the moveable member with respect to possible oscillations about the vertical axis is obtained in this manner.

A pantograph mechanism 56 for horizontal movement of the sliding member 33 is inferiorly hinged onto the outer support portion 53 of the movable member 52.

The pantograph mechanism 56 comprises an articulated arm 57 having a proximal end hinged on the outer support portion 53 of the movable member 52 and a distal end. A first 58 and a second connecting rod-like arm 59 comprising respective proximal and distal ends are coaxially hinged on the distal end of the articulated arm 57 by means of said proximal ends. Conversely, the distal end of the first connecting rod-like arm 58 is hinged onto a fixed element 60 associated with the support structure of the blowing or stretch-blowing machine or of the mold 1, while the distal end of the second connecting rod-like arm 59 is hinged on the sliding element 33.

In this manner, when the movable member 52 slides downwards, following the rotation in one direction of the Archimedes' screw 51, the two connecting rod-like arms 58, 59 move to the aligned or nearly aligned position so as to reach the maximum spatial distance between the respective distal ends (FIG. 4A). The sliding member 33 is thus in its advanced position and the mold 1 is closed.

Conversely, when the Archimedes' screw 51 turns in the opposite direction and thus the moveable member 52 slides upwards, the two connecting rod-like arms 58, 59 assume an upside-down V position, which corresponds to a smaller distance between the respective distal ends. Consequently, the sliding member 33 is found in the retreated position and the mold 1 is open (FIG. 4B).

Figure 5:
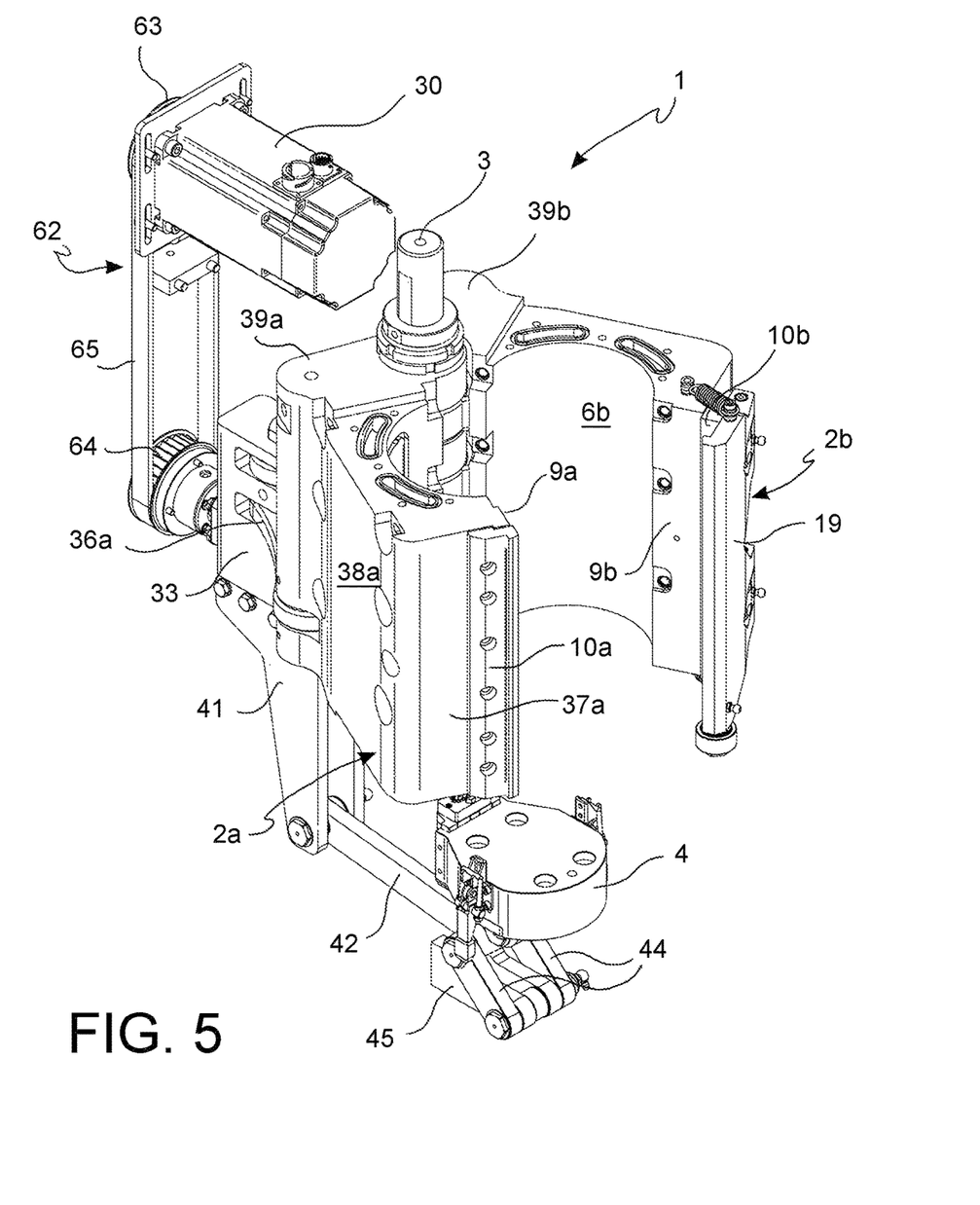
FIG. 5 shows a perspective view of a third embodiment of a mold for containers made of plastic material according to the invention in open mold operating condition.
Figure 6A:
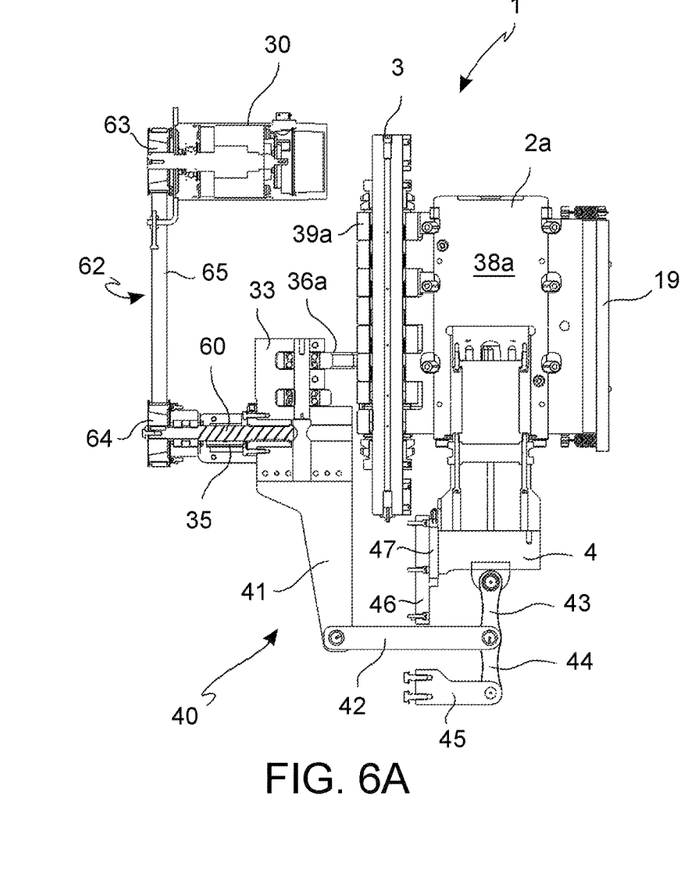
FIGS. 6A and 6B show section side views of the mold in FIG. 5, in two different operating conditions.
Figure 6B:
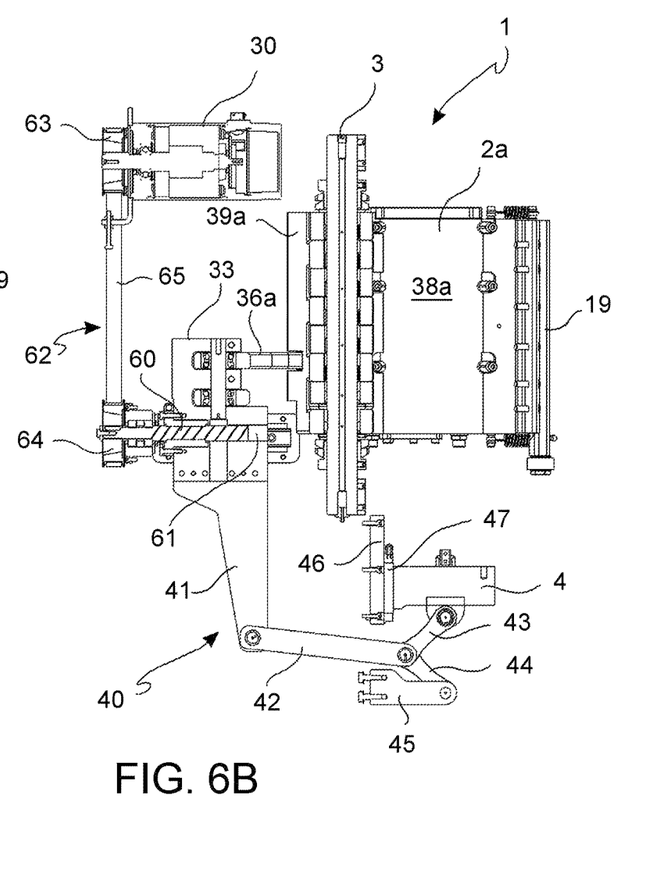

With reference to FIGS. 5, 6A and 6B, the sliding of the sliding member 33 between the retreated position (FIG. 6B) and the advanced position (FIG. 6A) is operated by means of an Archimedes' screw 60 which directly acts on the sliding member 33. For this purpose, the sliding member 33 comprises a tubular cavity 61, arranged along an horizontal straight line lying in the vertical plane which divides the two half-molds 2a, 2b, inside which cavity 61 the Archimedes' screw 60 is inserted. Suitable bosses present on the inner surface of the tubular cavity 61 cooperate with the grooves of the Archimedes' screw 60 so that the sliding member 33 either advances or retreats according to the rotation direction of the Archimedes' screw 60 when the latter rotates.

The Archimedes' screw 60 is connected to the rotating actuator 30 by means of a belt or chain transmission system 62. The actuator 30 is horizontally arranged above the sliding member 33, with its body protruding towards the mold 1, so as to minimize dimensions. The transmission system 62 comprises a first pinion 63, directly associated with the actuator 30 shaft, a second pinion 64, either directly or indirectly associated with the Archimedes' screw 60, and a belt or chain 65.

The rotation of the shaft of the actuator 30 either in one direction or in the opposite direction thus causes a corresponding rotation of the Archimedes' screw 60 which, as mentioned, makes the sliding member 33 either advance or retreat, thus obtaining the closing or the opening of the mold 1, respectively.

In some embodiments (not shown) the actuator 30 may be connected directly to the Archimedes' screw 60, without the interposition of the transmission system 62. This solution increases the dimensions but reduces the problems connected to the response delay of the Archimedes' screw 60 caused by the elasticity or by the clearances of the transmission system 62.

In preferred embodiments, the blowing and stretch-blowing machine or the mold 1 comprise a command and control unit which governs the motion law for opening/closing the individual molds 1 thus allowing to provide predefined opening/closing cycles for every type of container to be formed. For example, an incomplete opening of the molds may be provided if the container to be formed is small in size, thus obtaining an increase of productivity, as mentioned above.

This is a considerable advantage with respect to the conventional machines because no replacement of mechanical parts (cam profiles) is required.

In some embodiments, the command and control unit governs the entire operation of the machine, such as:
  the pressure sensors inside the molds
  the processing times
  the blowing process parameters
  the warning signals
  the preform heating
  the operating speed of the machine.

It is apparent that only some particular embodiments of the present invention have been described, to which a person skilled in the art will be able to make all the changes necessary to its adaptation and particular applications, without because of this departing from the scope of protection of the present invention.

The invention claimed is:

1. A blowing or stretch-blowing machine for bottles or containers made of polymer material, the machine comprising:
   a plurality of molds movable on a transport system,
   wherein each of the molds comprises a first half-mold and a second half-mold hinged around a hinge axis and a bottom plate, and means for vertical/translation movement of the bottom plate, to cyclically form, in cooperation with suitable shaped portions, a closed cavity adapted to receive a preheated preform and to allow expansion by blowing or stretch-blowing of the preform inside the cavity to obtain a bottle or container, each of the molds comprises a system for synchronized opening/closing of the half-molds and of the bottom plate actuated by its own actuator independent of motorization of the machine, the mold comprises a sliding member which has a slide slidably mounted on guide means, the sliding member is movable between an advanced position (or closed position) and a retreated position (or open position) along a direction defined by a straight line lying in a vertical plane that divides the half-molds, and the sliding member is associated with a system of articulated arms that comprises:

a first arm that has a proximal end and a distal end, and the proximal end is fixed on the lower part to the sliding member;

a second arm that has a proximal end and a distal end, and the proximal end is hinged at the distal end of the first arm;

a pair of connecting rod-like arms, each of the pair of connecting rod-like arms has a proximal end and a distal end, and the respective proximal ends are coaxially hinged to the distal end of the second arm; and:

the distal end of a first connecting rod-like arm is hinged on the lower surface of the bottom plate, and the distal end of the second connecting rod-like arm is hinged to a fixed element, such that when the sliding member is in an advanced position, the bottom plate is in a raised position (or closed position); conversely, when the sliding member is in retreated position, the bottom plate is in a lowered position (or open position).

2. The machine according to claim 1, wherein the actuator is one of a rotating or linear movement actuator, a stepper motor, or a linear or a rotating brushless motor.

3. The machine according to claim 1, wherein each half-mold has a C-shaped cross section which comprises a front portion, a side portion and a rear portion, and the bottom plate is vertically slidable on a guide element by a slide.

4. The machine according to claim 3, wherein the sliding member is connected to the two half-molds by respective connecting rods, the connecting rods have first ends coaxially hinged on the sliding member and second ends respectively hinged at the junction point between the side portions and the rear portions of the half-molds such that when the sliding member is in an advanced position, the mold is closed; conversely, when the sliding member is in a retreated position the mold is open.

5. The machine according to claim 4, wherein the actuator is vertically arranged with the shaft facing down and acts on an eccentric member, in turn hinged to a first end of a crank, and the second end of the crank is hinged on the sliding member.

6. A blowing or stretch-blowing machine for bottles or containers made of polymer material, the machine comprising:

a plurality of molds movable on a transport system, wherein each of the molds comprises a first half-mold and a second half-mold hinged around a hinge axis and a bottom plate, and means for vertical/translation movement of the bottom plate, to cyclically form, in cooperation with suitable shaped portions, a closed cavity adapted to receive a preheated preform and to allow expansion by blowing or stretch-blowing of the preform inside the cavity to obtain a bottle or container, each of the molds comprises a system for synchronized opening/closing of the half-molds and of the bottom plate actuated by its own actuator independent of motorization of the machine, each half-mold has a C-shaped cross section which comprises a front portion, a side portion and a rear portion, and the bottom plate vertically slidable on a guide element by a slide, the mold comprises a sliding member which has a slide slidably mounted on guide means, the sliding member is movable between an advanced position (or closed position) and a retreated position (or open position) along a direction defined by a straight line lying in a vertical plane that divides the half-molds, and the sliding member is connected to the two half-molds by respective connecting rods, the connecting rods have first ends coaxially hinged on the sliding member and second ends respectively hinged at the junction point between the side portions and the rear portions of the half-molds such that when the sliding member is in an advanced position, the mold is closed, conversely, when the sliding members is in a retreated position the mold is open, and the actuator is connected to an Archimedes' screw, the Archimedes' screw is operatively connected to a movable member which comprises a tubular portion having internally bosses which mate with grooves of the Archimedes' screw such that, when Archimedes' screw rotates, the movable member moves upwards or downwards according to a rotational direction of the Archimedes' screw, and the movable member is hinged on the lower part to a pantograph mechanism for horizontal movement of the sliding member.

7. The machine according to claim 6, wherein the movable member comprises an outer support portion comprising a slide arranged parallel to the Archimedes' screw, and the slide slides on a guide element.

8. The machine according to claim 6, wherein the pantograph mechanism comprises an articulated arm which has a proximal end hinged on the outer support portion of the movable member and a distal end, a first and a second connecting rod-like arm, comprising respective proximal and distal ends, is coaxially hinged on the distal end of the articulated arm by the proximal ends, while the distal end of the first connecting rod-like arm is hinged on a fixed element and the distal end of the second connecting rod-like arm is hinged on the sliding element such that when the movable member slides downward, the mold is brought to a closed condition, whereas, when the movable member slides upward, the mold is brought to an open condition.

9. A blowing or stretch-blowing machine for bottles or containers made of polymer material, the machine comprising:

a plurality of molds movable on a transport system, wherein each of the molds comprises a first half-mold and a second half-mold hinged around a hinge axis and a bottom plate, and means for vertical/translation movement of the bottom plate, to cyclically form, in cooperation with suitable shaped portions, a closed cavity adapted to receive a preheated preform and to allow expansion by blowing or stretch-blowing of the preform inside the cavity to obtain a bottle or container, each of the molds comprises a system for synchronize opening/closing of the half-molds and of the bottom plate actuated by its own actuator independent of motorization of the machine, each half-mold has a C-shaped cross section which comprises a front portion, a side portion a rear portion, and the bottom plate is vertically slidable on a guide element by a slide, the mold comprises a sliding member which has a slide slidably mounted on guide means, the sliding member is movable between an advanced position (or closed position) and a retreated position (or open position) along a direction defined by a straight line lying in a vertical plane that divides the half-molds, and the sliding member is connected to the two half-molds by respective connecting rods, the connecting rods have first ends coaxially hinged on the sliding member and second ends respectively hinged at the junction point between the side portions and the rear portions of the half-molds such that when the sliding member is in an advanced position, the mold is closed; conversely, when the sliding member is in a retreated position the mold is open, and the actuator is connected, by a transmission system, to an Archimedes' screw directly acting on the sliding member.

10. The machine according to claim 9, wherein the sliding member comprises a tubular cavity, arranged along an horizontal straight line lying in the vertical plane that divides the two half-molds, inside which cavity the Archimedes' screw is inserted, in which suitable bosses present on an inner surface of the tubular cavity cooperate with grooves of the Archimedes' screw such that, when the Archimedes' screw rotates, the sliding member advances or retreats depending on a rotational direction of the Archimedes' screw.

11. The machine according to claim 9, wherein the actuator is arranged horizontally above the sliding member, with its body protruding towards the mold.

12. The machine according to claim 9, wherein the transmission system comprises a first pinion, directly associated with the actuator shaft, a second pinion, directly or indirectly associated with the Archimedes' screw, and a belt or chain.

13. The machine according to claim 1, comprising a command and control unit governing motion law for opening/closing the individual molds and the bottom plate so as to provide predefined opening/closing cycles for every type of container to be formed.

14. The machine according to claim 13, wherein the command and control unit governs:
pressure sensors inside the molds,
processing times,
blowing process parameters,
warning signals,
preform heating, and
operating speed of the machine.

15. The machine according to claim 1, wherein the machine is a rotating machine.

\* \* \* \* \*